United States Patent Office 3,522,295
Patented July 28, 1970

---

3,522,295
METHOD OF PREPARING MONOETHANOLAMINE SALT OF THIOGLYCOLIC ACID
Nikolai Alexandrovich Konstantinov, Ul. Khanzas 8, kv. 9, Riga, U.S.S.R.
No Drawing. Filed Aug. 26, 1965, Ser. No. 482,937
Int. Cl. C07c *149/22, 127/00*
U.S. Cl. 260—501.19                2 Claims

ABSTRACT OF THE DISCLOSURE

A method for the prepartion of the monoethanolamine salt of thioglycolic acid which comprises heating S-carboxymethylisothiourea and monoethanolamine in an aqueous medium at 80–105° C.

---

This invention relates to a method for preparing the monoethanolamine salt of thioglycolic acid which is useful in the perfume and cosmetic industry.

At present, monoethanolamine thioglycolate is used extensively in cold wave formulations and, therefore, methods of preparing said salt are of considerable interest.

There is known a process for the preparation of the monoethanolamine salt of thioglycolic acid which comprises reacting thioglycolic acid and aqueous monoethanolamine. This reaction requires cooling and proceeds according to the following general scheme:

$HSCH_2COOH + 2NH_2CH_2CH_2OH$
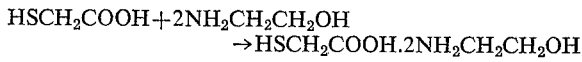
$\rightarrow HSCH_2COOH \cdot 2NH_2CH_2CH_2OH$ Said process, however, suffers from a number of disadvantages among which is the fact that thioglycolic acid is an expensive compound. This acid is unstable, readily undergoes polymerization upon storage, and is oxidized in the air, thereby adversely affecting the quality of hair wave formulations. Moreover, the prior art process for the manufacture of thioglycolic acid is elaborate and involves such steps, as extraction with ether and vacuum distillation, which present health hazards. Therefore, it is a matter of great importance to replace the thioglycolic acid by another starting material.

It is an object of the present invention to provide a simple and economical method for preparing the monoethanolamine salt of thioglycolic acid.

Another object of the invention is to manufacture high-grade cold wave formulations based on the monoethanolamine salt of thioglycolic acid synthesized by the method of the present invention.

A further object of the invention is to prepare said salt of thioglycolic acid from cheap, readily available starting materials.

Still another object of the invention is to provide a simple flow process making it possible to carry out the present method at any chemical or cosmetic speciality plant.

Yet another object of the invention is to provide a method, the embodiment of which requires no elaborate chemical equipment, such as vacuum distillation columns, extractors, etc.

The objects listed hereinabove have been accomplished by a method which comprises reacting a thio derivative of carbonic acid with aqueous monoethanolamine, wherein, the thio derivative of carbonic acid used is S-carboxymethylisothiourea and the reaction is carried out at elevated temperature, preferably at 80 to 105° C.

The reaction can be represented by the following general scheme:

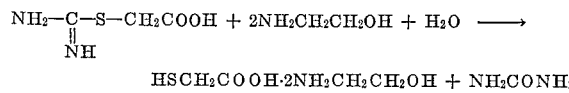

$HSCH_2COOH \cdot 2NH_2CH_2CH_2OH + NH_2CONH_2$

S-carboxymethylisothiourea can be readily prepared by reacting sodium monochloroacetate with thiourea and is, therefore, commercially available.

The advantages of the method of the present invention are listed hereinbelow.

S-carboxymethylisothiourea is a solid crystalline compound, which is quite stable in storage and undergoes neither oxidation nor polymerization.

S-carboxymethylisothiourea is a cheap and readily available compound.

The present invention makes possible an improvement in the quality of cold wave formulations.

The present invention lowers the cost of manufacturing the product compound by at least 10 to 20 times as a result of the employment of cheap starting materials.

For a better understanding of the present invention by those skilled in the art the following example is given by way of illustration.

EXAMPLE 130 g. of S-carboxymethylisothiourea are heated, with stirring, with 300 ml. of water and 130 ml. of monoethanolamine at a temperature of 95 to 105° C. for 5 minutes until the reactants are completely dissolved. The solution obtained is cooled to 15–20° C. The procedure yields about 500 ml. of an aqueous solution of the monoethanolamine salt of thioglycolic acid containing approximately 17% of thioglycolic acid.

The total content of the active component calculated as thioglycolic acid equals 82 g. (90% of theoretical based on the initial amount of thiourea).

We claim:
1. A method for preparing the monoethanolamine salt of thioglycolic acid which comprises reacting with heating, S-carboxymethylisothiourea and aqueous monoethanolamine.
2. A method according to claim 1, wherein the reaction is carried out at a temperature of 80 to 105° C.

References Cited

UNITED STATES PATENTS 2,468,426  4/1949  Cheney et al. _____ 260—470
2,990,336  6/1961  Martin _____ 260—541

FOREIGN PATENTS 629,537  9/1949  Great Britain.
1,440,597  4/1966  France.

OTHER REFERENCES

Houben-Weyl: "Methoden der Organischem Chemie," vol. 9 (1955), 15.

Phillips et al.: J. Am. Chem. Soc., vol. 45, pp. 1755–7 (1923).

LEON ZITVER, Primary Examiner
M. W. GLYNN, Assistant Examiner

U. S. Cl. X.R.
260—555, 526, 534